United States Patent
Nakazawa (10) Patent No.: US 6,674,480 B2
(45) Date of Patent: Jan. 6, 2004

(54) DEVICE FOR AND METHOD OF CONVERTING A FRAME RATE IN A MOVING PICTURE DECODER, AND A RECORD MEDIUM AND AN INTEGRATED CIRCUIT DEVICE FOR IMPLEMENTING SUCH A METHOD

(75) Inventor: Takeshi Nakazawa, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 397 days.

(21) Appl. No.: 09/770,508

(22) Filed: Jan. 29, 2001

(65) Prior Publication Data

US 2001/0010708 A1 Aug. 2, 2001

(30) Foreign Application Priority Data

Jan. 31, 2000 (JP) ...................... P2000-023405

(51) Int. Cl.[7] .............................................. H04N 11/00
(52) U.S. Cl. .................................. 348/459; 375/240.28
(58) Field of Search ................................ 348/441, 459, 348/558, 446, 448, 97, 700; 375/240, 240.25, 240.26, 240.28

(56) References Cited

U.S. PATENT DOCUMENTS

| | | | |
|---|---|---|---|
| 5,623,311 A | 4/1997 | Phillips et al. | 348/396 |
| 5,835,636 A * | 11/1998 | Auld | 382/233 |
| 5,874,995 A | 2/1999 | Naimpally et al. | 348/384 |
| 6,148,035 A | 11/2000 | Oishi et al. | |
| 6,157,739 A | 12/2000 | Yazawa et al. | |
| 6,282,245 B1 | 8/2001 | Oishi et al. | |
| 6,385,240 B2 * | 5/2002 | Nishio | 375/240 |
| 6,441,813 B1 * | 8/2002 | Ishibashi | 345/213 |
| 6,466,624 B1 * | 10/2002 | Fogg | 375/240.27 |

FOREIGN PATENT DOCUMENTS

| | | |
|---|---|---|
| JP | 7-288740 | 10/1995 |
| JP | 08-228349 | 9/1996 |
| JP | 8-237612 | 9/1996 |
| JP | 10-136315 | 5/1998 |
| JP | 10-322693 | 12/1998 |
| JP | 10-322704 | 12/1998 |
| JP | 10-336595 | 12/1998 |
| JP | 11-88845 | 3/1999 |
| JP | 11-133935 | 5/1999 |

* cited by examiner

Primary Examiner—Victor R. Kostak
(74) Attorney, Agent, or Firm—Foley & Lardner (57) ABSTRACT

A frame-rate converting device in a moving picture decoder which realizes a smooth display of pictures at a frame rate of 30 Hz or 60 Hz based on stream data whose frame rate of 24 Hz is provided. A control section performs a 3:2 pull-down processing when the output frame rate is 24 Hz and when a re-display of picture is indicated. When a re-display of picture is not indicated, the control section detects that the picture is of a progressive material, and repeats one field every two frames. When the picture is not a progressive material, the control section determines whether the top and the bottom of the picture are of the same time instant and repeats one field every two frames when they are of the same time instant but repeats one frame every four frames when they are not of the same time instant.

10 Claims, 6 Drawing Sheets

| INPUT INFORMATION | START CODE |
|---|---|
| Picture_start_code | 00 |
| Slice_start_code | 01~AF |
| User_data_start_code | B2 |
| Sequence_header_code | B3 |
| Sequence_error_code | B4 |
| Extension_start_code | B5 |
| Sequence_end_code | B7 |
| Group_start_code | B8 |

FIG. 3

| FRAME-RATE CODE | FRAME FREQUENCY (Hz) |
|---|---|
| 0000 | forbidden |
| 0001 | 24000÷1001 (23.976···) |
| 0010 | 24 |
| 0011 | 25 |
| 0100 | 30000÷1001 (29.97···) |
| 0101 | 30 |
| 0110 | 50 |
| 0111 | 60000÷1001 (59.94···) |
| 1000 | 60 |
| ··· | reserved |
| 1111 | reserved |

DEVICE FOR AND METHOD OF CONVERTING A FRAME RATE IN A MOVING PICTURE DECODER, AND A RECORD MEDIUM AND AN INTEGRATED CIRCUIT DEVICE FOR IMPLEMENTING SUCH A METHOD

BACKGROUND OF THE INVENTION

1. Field of the Invention

This invention relates to a device for converting a frame rate in a moving picture decoder which outputs stream data, whose output frame rate has been set to 24 Hz, at an output frame rate of 30 Hz or 60 Hz.

2. Description of the Related Art

The present MPEG (Moving Picture coding Experts Group) standard defines an input stream whose frame rate, which represents a period of displaying one frame of a picture, is set to 24 Hz, 30 Hz or 60 Hz, for example. When the rate of frames contained in the stream data is 30 Hz, a television set which is provided with a moving picture decoder and to which a frame rate of 30 Hz has been set decodes the encoded input stream in accordance with this frame rate thereby to display pictures.

When stream data having a frame rate of 24 Hz is inputted to a television set which is provided with a moving picture decoder and whose frame rate has been set to 30 Hz or 60 Hz, the frame rate of 24 Hz must be converted to 30 Hz or 60 Hz in order to display pictures.

For such a reason, when decoding stream data whose frame rate has been set to 24 Hz thereby to display pictures, the conventional moving picture decoder causes one frame of a picture to be re-displayed (i.e., one frame to be repeated) once every four frames thereby to bring the display period of the pictures into agreement with a period which corresponds to the frame rate set thereto. In addition, the conventional moving picture decoder may cause such an operation that the frame rate is set erroneously to 24 Hz due, for example, to an error occurring during the encoding, even when a re-display of picture is indicated by the Repeat_First_Field flag, with the result that one frame is repeated once every four frames to display pictures.

The conventional moving picture decoder thus repeats one frame of pictures once every four frames, so that the quality of pictures is low because the displayed pictures are rather coarse and it is difficult to attain a smooth display of pictures.

SUMMARY OF THE INVENTION

It is therefore an object of the present invention to provide a frame-rate converting device for a moving picture decoder which makes it possible to perform a smooth display of pictures even when a display is made on a monitor of 30 Hz or 60 Hz based on stream data whose input frame rate is 24 Hz.

In order to achieve the above object, according to the present invention a repeat-first-field information, a progressive-sequence information and a progressive-frame information, which correspond to each picture, are extracted from a received stream as header information and a control is performed such that pictures are displayed in accordance with the extracted header information. Thus, pictures can be displayed in a smooth manner according to the invention.

The present invention may be arranged to determine whether each picture is of the progressive scanning based on the progressive-sequence information when the repeat-first-field information contained in the received header information does not indicate a re-display of picture, and to re-display one field of a picture once every two frames when the determination result indicates the progressive scanning. In this way, the pictures can be displayed in a smooth manner.

The present invention may also be arranged to determine whether each picture is of the progressive scanning based on the progressive-sequence information, to further determine whether a first field and a second field constituting one frame of a picture are composed of picture data of the same time instant (i.e., whether the picture has a frame structure of the progressive-scanning type) based on the progressive-frame information when the result of the former determination does not indicate the progressive scanning, and to re-display one field of a picture once every two frames when the latter determination indicates that the picture data is of the same time instant. In this way, the pictures can be displayed in a smooth manner.

The present invention may further be arranged to perform a 3:2 pull-down display when a re-display of pictures is instructed by the repeat-first-field information. With this arrangement, a degradation of picture quality can be suppressed and a smooth display of pictures can be achieved even when an error stream to which the frame rate of 24 Hz has been set together with the repeat-first-field information is received.

DETAILED DESCRIPTION OF THE PREFERRED EMBODIMENTS

A frame-rate converting device provided in accordance with an embodiment of the invention will now be described with reference to the drawings.

Figure 1:
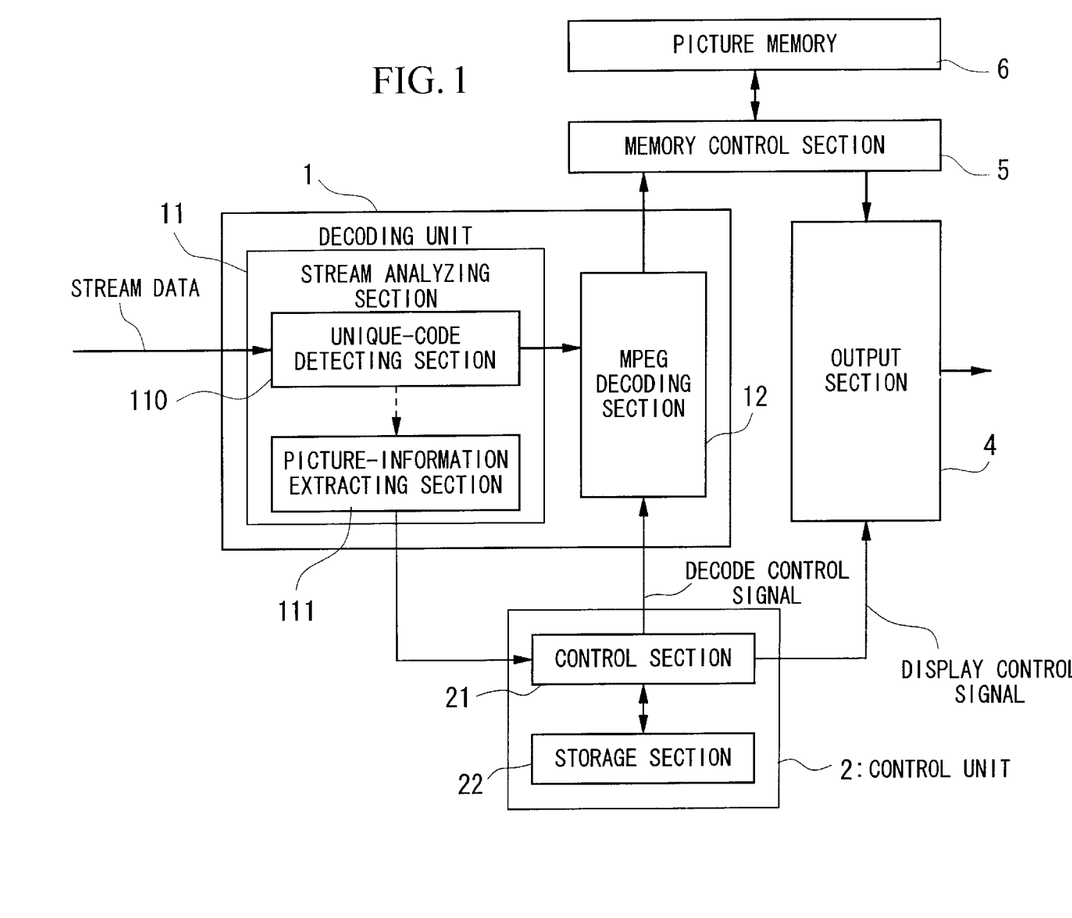
FIG. 1 is a block diagram of a moving picture decoder to which a frame-rate converting device provided in accordance with an embodiment of the present invention is applied.

FIG. 1 is a block diagram of a moving picture decoder to which the frame-rate converting device has been applied. In FIG. 1, a decoding unit 1 comprises a stream analyzing section 11 and an MPEG decoding section 12, and extracts header information containing frame-rate information and the like from stream data received from the outside and decodes the picture data.

Figure 2:
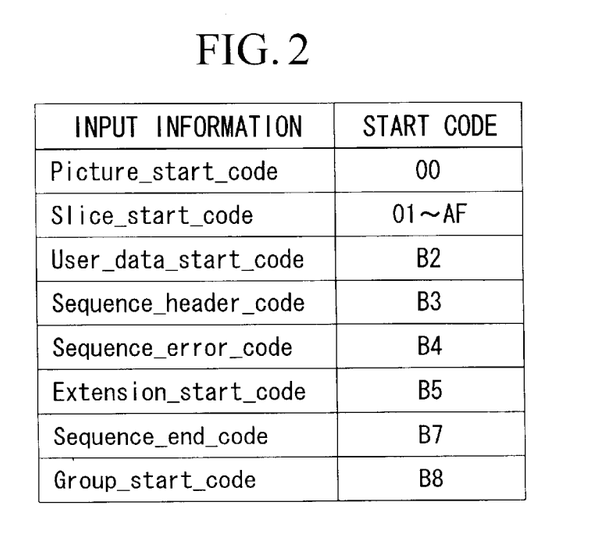
FIG. 2 is an illustration showing the relation between the header information and the start code values.

The stream analyzing section 11 comprises a unique-code detecting section 110 and a picture-information extracting section 111. The unique-code detecting section 110 detects from the received stream data the beginning of each header information such as a sequence header and a picture header present in its sequence layer thereby to determine which kind of information was received. More specifically, the unique-code detecting section 110 has start-code information previously stored therein as table information shown in FIG. 2, and determines which kind of information was received based on a start-code value following each unique code ("0000 0000 0000 0000 0000 0001" in binary representation) contained in the received stream and the previously stored table information. When data "B3 (hexadecimal number)" is received after the unique code, for example, the unique-code detecting section 110 determines that a "Sequence_header_code" is detected. Besides the above operation, the unique-code detecting section 110 supplies the received stream data to the MPEG decoding section 12.

The picture-information extracting section 111 extracts a frame-rate code (frame_rate_code) present after the "Sequence_header_code" based on the detection result at the unique-code detecting section 110 and outputs the code to a control section 21. The picture-information extracting section 111 also extracts a Progressive_Sequence flag which is present in a Progressive_Extension layer after the "Sequence_header_code" and Top_Field_First, Repeat_First_Field and Progressive_Frame flags which are present after the "Picture_start_code", and outputs the extracted flags to a control unit 2.

The Progressive Frame_flag of "1" indicates that a top picture formed by odd lines (hereinafter referred to simply as "top") and a bottom picture formed by even lines (hereinafter referred to simply as "bot") of each single screen of picture specified by this flag are picture parts at the same time instant. In contrast, the Progressive_Frame flag of "0" indicates that the top and the bot of each single screen of picture specified by this flag are picture parts at different time instants. The Top_Field_First flag is information for determining the order of display of the top and the bot of each picture specified by this flag.

The control unit 2 is constituted by the control section 21 and a storage section 22. The control section 21 outputs a decode control signal, which specifies information and timing necessary for decoding the picture data, to the MPEG decoding section 12 in accordance with the header information fed from the picture-information extracting section 111. The control section 21 also outputs a display control signal, which specifies information and timing necessary for displaying the pictures, to an output section 4 in accordance with the header information fed from the picture-information extracting section 111.

Figure 3:
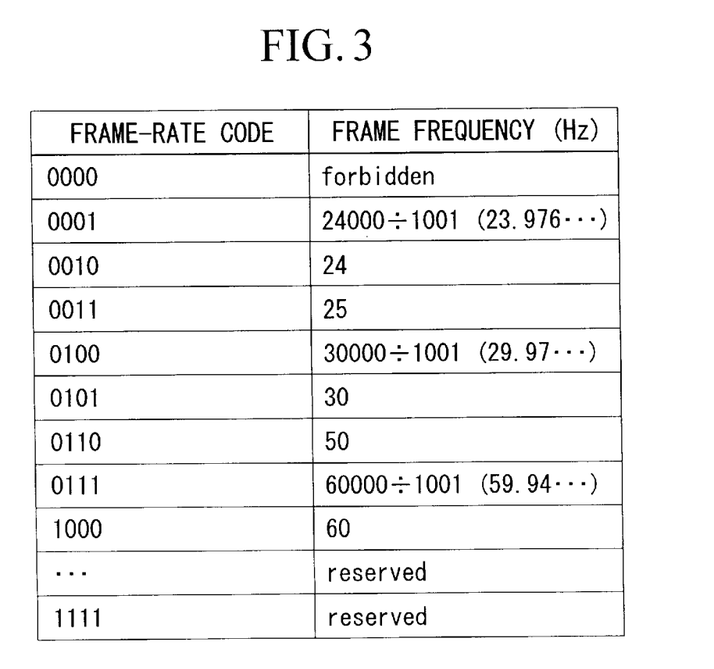
FIG. 3 is an illustration showing the relation between the frame-rate codes and frame frequencies.

The control section 21 stores information representative of frame frequencies corresponding to the frame_rate_codes fed from the picture-information extracting section 111 as the table information shown in FIG. 3. When the received frame-rate code is "0010", for example, the control section 21 selects 24 Hz as the frame frequency based on the table information.

Furthermore, the control section 21 monitors the Repeat_First_Field flag over a specific period of time, and carries out a 3:2 pull-down processing with respect to the pictures specified by this flag when the flag is on (that is to say, when a re-display of picture is instructed). The 3:2 pull-down processing is a processing operation for decoding stream data, which has been encoded at 24 frames/sec, at 30 frames/sec to perform a display. More specifically, the control section 21 causes frames whose frame rate is 24 frames/sec to be displayed at 60 fields/sec (30 frames/sec) by alternating three fields (one field repeated) and two fields.

On the other hand, when the Repeat_First_Field flag is off (i.e., when a re-display of picture is not instructed), the control section 21 performs the following operation based on the Progressive_Sequence flag. When the Progressive_Sequence flag is "1", the odd-line picture and the even-line picture are composed of a material of the same time instant, so that when the frame frequency is 24 Hz with the output frame rate (the output at the monitor) being 30 Hz, the control section 21 repeats one field once every two frames. In contrast, when the Progressive_Sequence flag is "0" (i.e., when in an interlace mode), the control section 21 carries out a control for displaying pictures based on the progressive frame information (described in more detail later).

The storage section 22 temporarily stores the header information fed from the control section 21.

Since the unique-code detecting section 110 outputs the encoded MPEG picture data as picture data as described earlier, the MPEG decoding section 12 decodes the I (Intra-coded), the P (Predictive coded) and the B (Bi-directionally predictive coded) picture data constituting the MPEG picture to generate resultant picture data. Timing for this decoding operation is controlled based on the decode control signal fed from the control section 21.

A memory control section 5 stores the picture data generated by the MPEG decoding section 12 into a picture memory 6 and outputs the picture data to the output section 4 in the order of displaying the pictures. More specifically, the picture memory 6 temporarily stores the decoded picture data. When the display control signal is supplied from the control section 21, the output section 4 reads the picture data specified by this display control signal from the picture memory 6 through the memory control section 5 and outputs the read picture data to a monitor (not shown). The monitor may be of the interlace type to which a frame rate of 30 Hz has been set, for example.

The operation of the frame-rate converting device with the structure shown in FIG. 1 will now be described with reference to a flow chart shown in FIG. 4.

When power is supplied to the various sections of the device and when stream data is inputted to the decoding unit 1, the unique-code detecting section 110 detects a unique code from the header information contained in the steam data, determines the content of the header information from the start-code value following the detected unique code and outputs the determination result to the picture-information extracting section 111. The unique-code detecting section 110 also sequentially outputs the input stream data to the MPEG decoding section 12.

The picture-information extracting section 111 extracts information such as the frame-rate code, the Progressive_sequence flag, the Top_Field_First flag, the Repeat_First_Field flag and the Progressive_Frame flag, which are contained in the header information of the stream data, based on the result of the determination by the unique-code detecting section 110, and outputs the extracted information to the control section 21. The control section 21 stores each information fed from the picture-information extracting section 111 to the storage section 22. The control section 21 also outputs the decode control signal to the MPEG decoding section 12 depending on whether the present processing time is within a specific time period for decoding a frame.

The control section 21 then determines, based on the frame-rate code, whether the frame rate of the input stream data is 24 Hz or not (step S1). When the frame rate is not 24 Hz (i.e., when the output frame rate is 30 Hz), the control section 21 carries out a control for outputting the picture data in accordance with the frame rate of 30 Hz (step S2). When the output frame rate is 24 Hz, however, the control section 21 determines whether the Repeat_First_Field flag is on or off (step S3). When the Repeat_First_Field flag is on (i.e., when it is an error stream), the control section 21 carries out the 3:2 pull-down processing (step S4).

On the other hand, when the Repeat_First_Field flag is off, the control section 21 determines whether the picture is of a progressive material or not based on the Progressive_Sequence flag (step S5), and carries out a control to repeat one field once every two frames in the case of progressive material (step S6). When the picture is not of a progressive material, however, the control section 21 determines whether the top and the bot of the picture are picture parts of the same time instant or not based on the Progressive_Frame flag (step S7). When the top and the bot of the picture are picture parts of the same time instant, the control section 21 carries out a control to repeat one field once every two frames (step S9). When the top and the bot of the picture are not picture parts of the same time instant, the control section 21 carries out a control to repeat one frame once every four frames (step S8).

Description will now be made, with reference to the timing charts shown in FIGS. 5 to 7, on picture data outputted from the output section 4 after the control section 21 has performed the processing in each of the steps S4, S6, S8 and S9.

Figure 5:
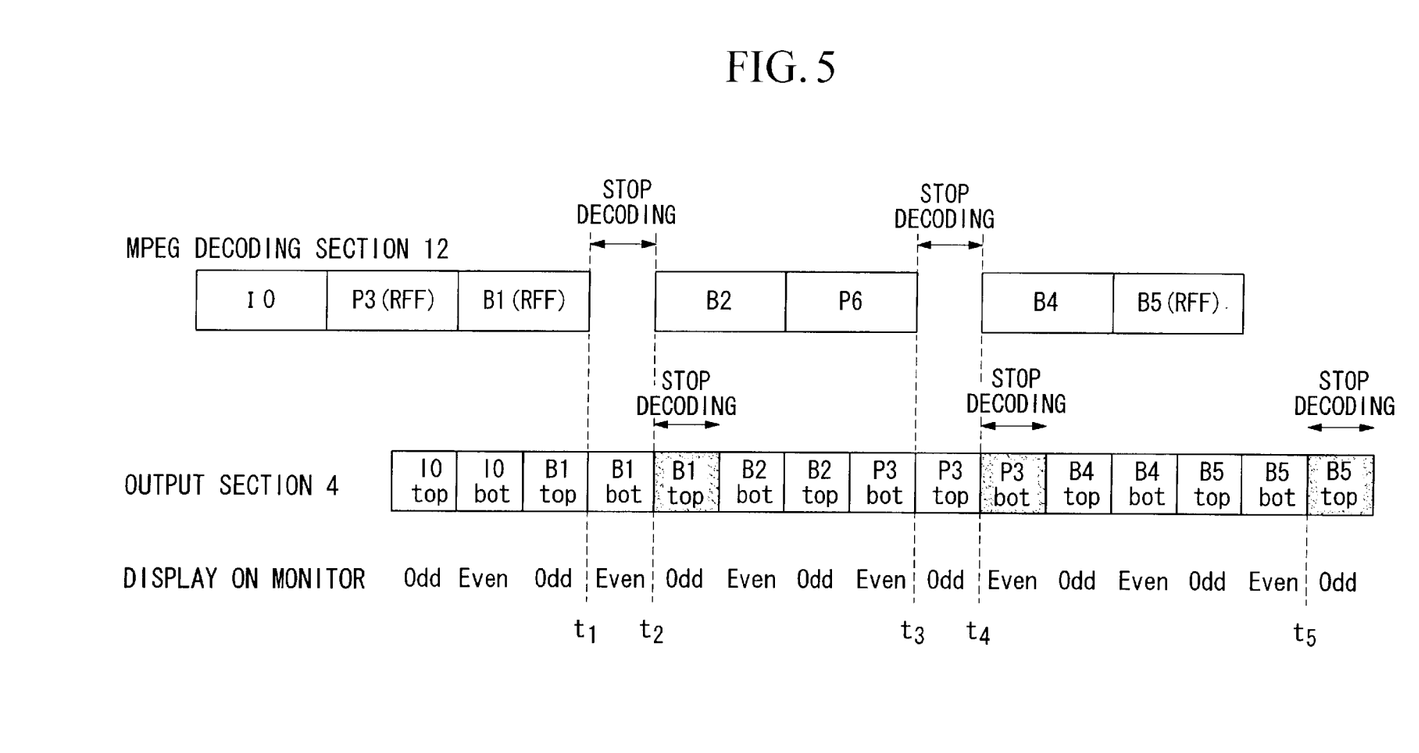
FIG. 5 is a timing chart which shows the picture data outputted from the output section 4 after the processing at the step S4 of FIG. 4 has been performed.

FIG. 5 is a timing chart showing picture data outputted from the output section 4 after the processing in step S4 was performed. The control section 21 outputs the decode control signal to the MPEG decoding section 12 in accordance with the picture information fed from the picture-information extracting section 111. The MPEG decoding section 12 decodes picture data contained in the stream data fed from the unique-code detecting section 110 in the order of the I0 picture, the P3 picture, the B1 picture, . . . , the B4 picture and the B5 picture in accordance with the timing indicated by the decode control signal (see "MPEG decoding section 12" in FIG. 5).

The control section 21 also outputs the display control signal to the output section 4 and outputs a display delay command for delaying display of each picture to which the Repeat_First_Field flag (indicated in FIG. 5 by "RFF") has been set to the output section 4 based on the picture information fed from the picture-information extracting section 111. The output section 4 causes pictures to be displayed in accordance with the display control signal and the display delay command (see "output section 4" in FIG. 5). In this case, those pictures which are repeated by the display delay commands are B1top, P3bot and B5top (shown at t2, t4 and t5 of "output section 4" in FIG. 5, respectively).

In addition, when causing each picture to which header information containing the Repeat_First_Field flag has been set to be displayed, the control section 21 supplies a decode delay command for delaying the decoding time in accordance with the time for re-displaying the relevant picture (i.e., a command to temporarily stop the decoding) to the MPEG decoding section 12 (see the intervals between t1 and t2 and between t3 and t4 of "MPEG decoding section 12" in FIG. 5). This will avoid the occurrence of a difference between the decoding time and the display time of a picture. Also, when the top and the bot of each picture received from the output section 4 are outputted to the monitor, the top and the bot are displayed in correspondence with "Odd" and "Even", respectively, as shown at "display on monitor" in FIG. 5, so that the pictures are displayed with a high fidelity.

Figure 4:
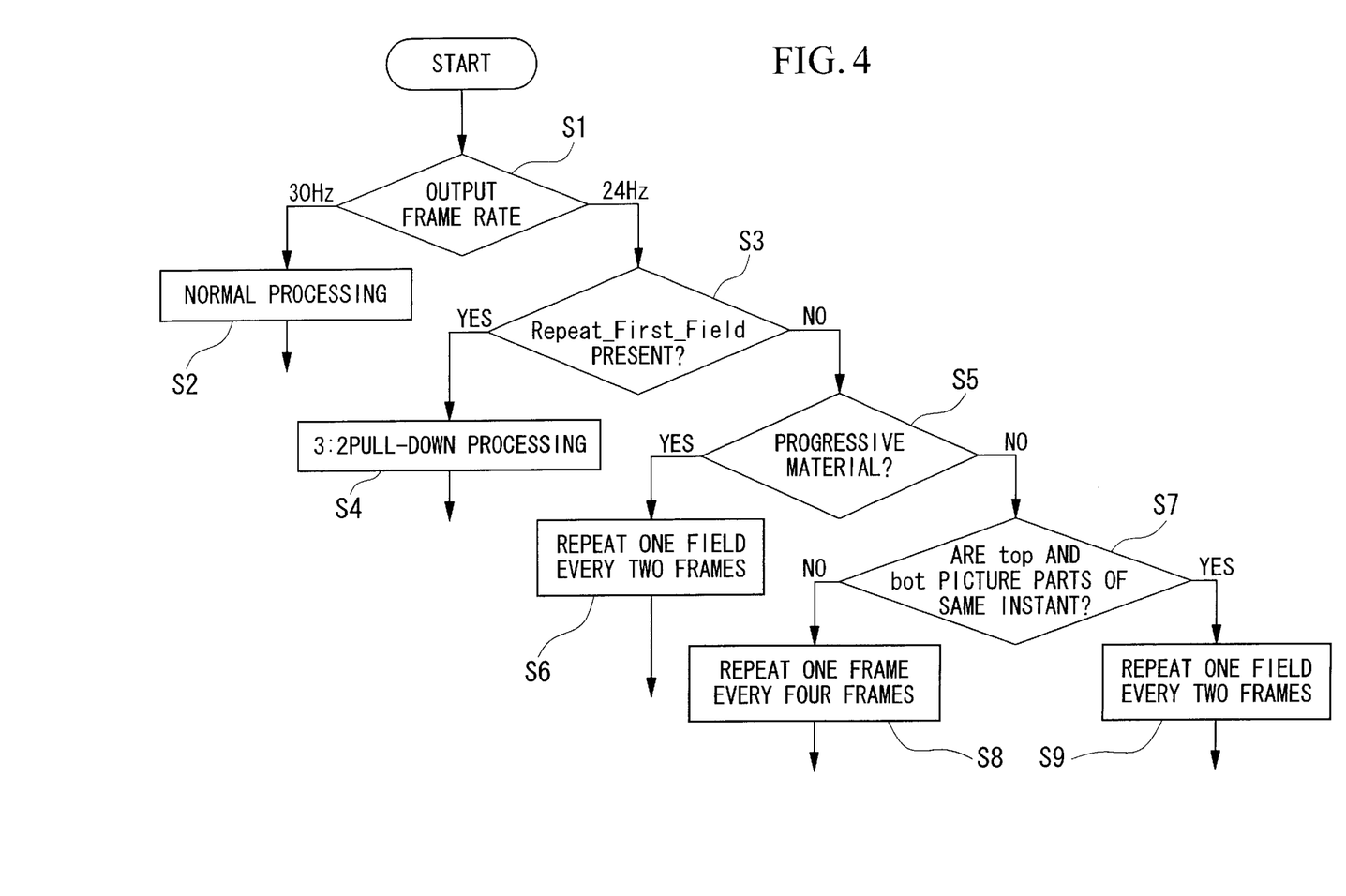
FIG. 4 is a flow chart which explains the operation of the frame rate converting device shown in FIG. 1.
Figure 6:
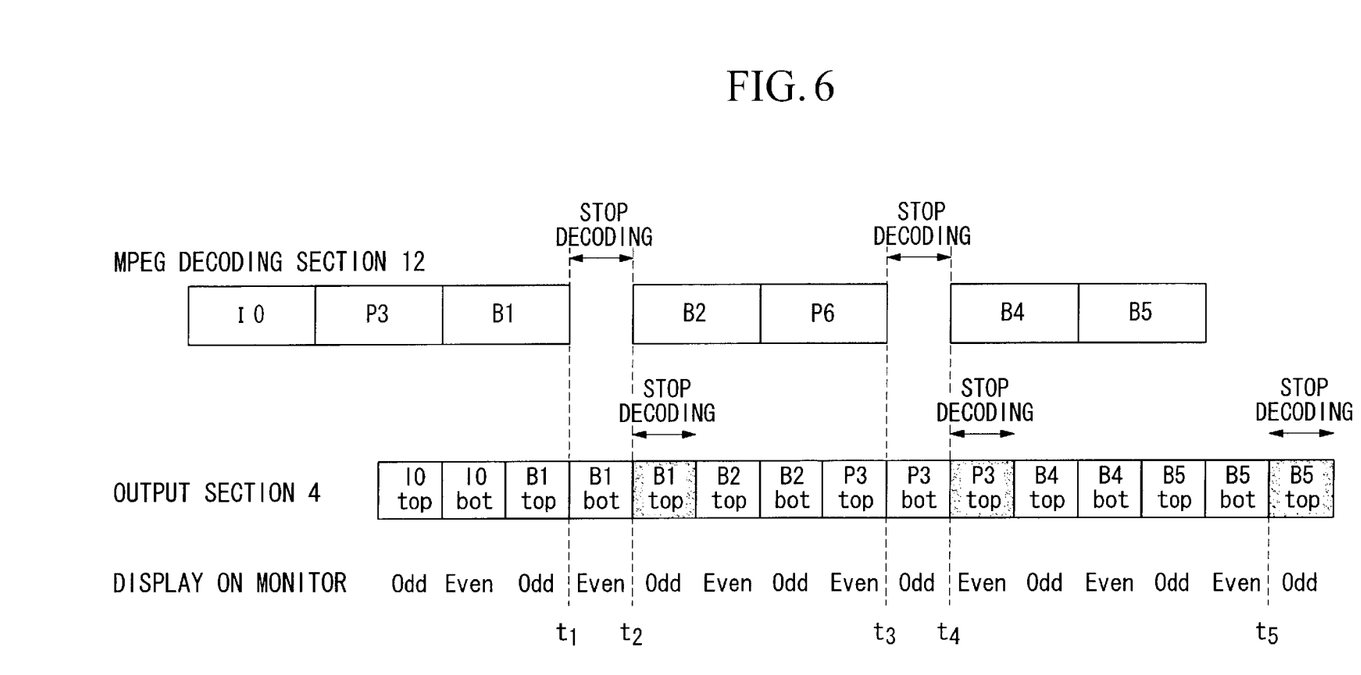
FIG. 6 is a timing chart which shows the picture data outputted from the output section 4 after the processing at the step S9 of FIG. 4 has been performed.

FIG. 6 is a timing chart showing picture data outputted from the output section 4 after the processing in step S9 of FIG. 4 was performed. The control section 21 outputs the decode control signal to the MPEG decoding section 12 depending on whether the present processing time is within a specific time period for decoding a frame. The MPEG decoding section 12 decodes picture data contained in the stream data fed from the unique-code detecting section 110 in the order of the I0 picture, the P3 picture, the B1 picture, . . . , the B4 picture and the B5 picture in accordance with the timing indicated by the decode control signal (see "MPEG decoding section 12" in FIG. 6).

The control section 21 also outputs the display control signal to the output section 4 and outputs a display delay command to the output section 4 for delaying display of one field of picture once every two frames depending on whether the present processing time is within a specific time period for decoding a frame. The output section 4 causes pictures to be displayed in accordance with the display control signal and the display delay command (see "output section 4" in FIG. 6). In this case, those pictures which are repeated by the display delay command are B1top, P3bot and B5top (shown at t2, t4 and t5 of "output section 4" in FIG. 6, respectively).

In addition, when causing a display of picture to be repeated, the control section 21 supplies a decode delay command for delaying the decoding time in accordance with the time for re-displaying the relevant picture (i.e., a command to temporarily stop the decoding) to the MPEG decoding section 12 (see the intervals between t1 and t2 and between t3 and t4 of "MPEG decoding section 12" in FIG. 6). This avoids the occurrence of a difference between the decoding time and the display time of a picture.

When the top and the bot of each picture outputted from the output section 4 are supplied to the monitor, they are displayed as shown at "display on monitor" in FIG. 6. In this case, although the B2top and the B2bot are displayed in "Even" and "Odd", respectively, these pictures can be displayed in a smooth manner even when the top and the bot are displayed in "Even" and "Odd", respectively since the B2top picture and the B2bot picture are picture parts which were sampled at the same instant. However, when the top and the bot are displayed in "Even" and "Odd", respectively, as in the above case, the display starting line should be corrected.

Although not specifically shown, the picture data outputted from the output section 4 at the step S6 shown in FIG. 4 results in a display of pictures whose sequence is similar to that shown in the timing chart of FIG. 6. In this case, however, the way of compressing the stream is different from that in FIG. 6.

Figure 7:
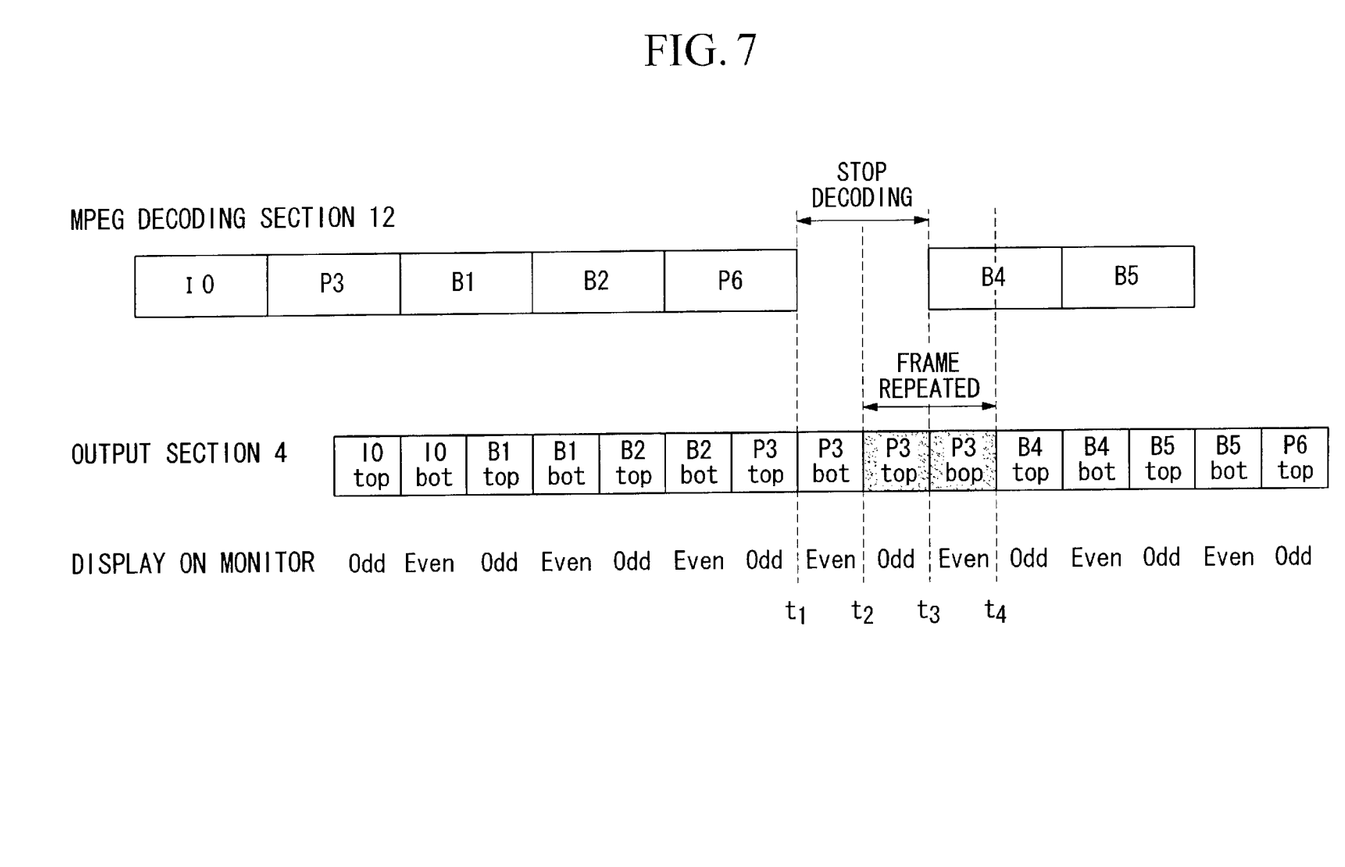
FIG. 7 is a timing chart which shows the picture data outputted from the output section 4 after the processing at the step S8 of FIG. 4 has been performed.

FIG. 7 is a timing chart showing picture data outputted from the output section 4 after the processing in step S8 of FIG. 4 was performed. The control section 21 outputs the decode control signal to the MPEG decoding section 12 depending on whether the present processing time is within a specific time period for decoding a frame. The MPEG decoding section 12 decodes picture data contained in the stream data fed from the unique-code detecting section 110 in the order of the I0 picture, the P3 picture, the B1 picture, . . . , the B4 picture and the B5 picture in accordance with the timing indicated by the decode control signal (see "MPEG decoding section 12" in FIG. 7).

The control section 21 also outputs the display control signal to the output section 4 depending on whether the present processing time is within a specific time period for displaying a frame and outputs a display delay command to the output section 4 for delaying display of one frame of picture once every four frames. The output section 4 then causes pictures to be displayed in accordance with the display control signal and the display delay command (see "output section 4" in FIG. 7). In this case, those pictures which are repeated by the display delay command are P3top and P3bot (shown at t2 and t3 of "output section 4" in FIG. 7, respectively).

In addition, when causing a display of a picture to be repeated, the control section 21 supplies a decode delay command for delaying the decoding time in accordance with the time for redisplaying the relevant picture (i.e., a command to temporarily stop the decoding) to the MPEG decoding section 12 (see the interval between t1 and t3 of "MPEG decoding section 12" in FIG. 7). This avoids the occurrence of a difference between the decoding time and the display time of a picture. When the top and the bot of each picture outputted from the output section 4 are supplied to the monitor, they are displayed in such a manner that the top and the bot correspond respectively to "Odd" and "Even" (see "display on monitor" in FIG. 7), whereby the pictures are reproduced with a high fidelity.

In the embodiments described above, it has been assumed that the moving picture decoder to which the frame-rate converting device according to the invention is applied is connected to a monitor of the interlaced-scanning type to which a frame rate of 30 Hz has been set. The same effects can also be attained by performing a field/frame conversion when a monitor of the progressive-scanning type to which a frame rate of 60 Hz has been set is connected.

While an embodiment of the present invention has been described with reference to the drawings, it should be understood that the actual structure of the invention is not restricted to those of the embodiments described above but includes any modified design made without departing from the spirit and scope of the invention.

The picture processing operation described above may be performed by recording programs for realizing the functions of various sections of the device shown in FIG. 1 on a computer readable record medium and by reading the programs recorded on the record medium into a computer system to execute them.

The computer system described above may include an operating system (OS) as well as hardware such as peripheral devices. The above-mentioned computer readable record medium may include a removable record medium such as a floppy disc, a magneto-optical disc, a ROM and a CD-ROM; a storage device such as a hard disc unit incorporated in a computer system; and a medium capable of storing programs for a certain period of time such as a volatile memory (RAM) incorporated in a server or a client computer system which can receive programs transmitted through a communication network such as the Internet or a communication line such as a telephone line.

The above programs may be transmitted from a computer system having a storage device in which these programs are stored to another computer system through a transmission medium or by means of a carrier wave propagated in such a transmission medium. Here, the transmission medium for transmitting the programs should be understood to mean a medium having a function of transmitting information, examples of which are a communication network such as the Internet and a communication line such as a telephone line.

Furthermore, the above programs may be of such a kind that they only realize a part or parts of the above-described functions and that they are combined with those programs already recorded in a computer system to realize these functions (so-called difference files or difference programs).

What is claimed is:

1. A device for converting a frame rate in a moving picture decoder which device decodes encoded moving picture data whose out frame rate has been set to 24 Hz and provides pictures at an output frame rate of 30 Hz or 60 Hz based on the decoded moving picture data, said device comprising:

a header information extracting section for extracting repeat-first-field information, progressive-sequence information and progressive-frame information contained in an in input stream corresponding to each picture as header information from said stream;

a storage section for storming said header information extracted by said header information extracting section;

wherein said control section reads said header information stored in said storage section in accordance with the order in which said pictures are displayed, determines whether each picture is for the progressive scanning fling based on said progressive-sequence information when said repeat-first-field information contained in the relevant header information does not indicate a re-display of the relevant picture, and carries out a control to re-display one field of a picture once every two frames when the result of said determination indicates the progressive scanning.

2. A device for converting a frame rate in a moving picture decoder according to claim 1, wherein said control section determines whether each picture is for the progressive scanning based on said progressive-sequence information, determines whether a first field and a second field constituting one frame of pictures are composed of picture data of the same time instant base on said progressive-frame information when the result of said determination based on said progressive-sequence information does not indicate the progressive scanning, and carries out a control to re-display one field of picture once every two frames when the result of said determination based on said progressive-frame information indicates that the picture data is of the same time instant.

3. A device for converting a frame rate in a moving picture decoder according to claim 2, wherein said control section carries out a control to re-display one frame of pictures once every four frames when the result of said determination based on said progressive-frame information indicates that the picture data is not of the same time instant.

4. A device for converting a frame rate in a moving picture decoder according to claim 1, wherein said control section causes a 3:2 pull-down display to be performed when said repeat-first-field information indicates a re-display of the relevant picture.

5. A method of converting a frame rate in a moving picture decoder in which encoded moving picture data whose output frame rate has been set to 24 Hz is decoded and in which pictures are provided at an output frame rate of 30 Hz or 60 Hz based on the decoded moving picture data, said method comprising the steps of:

a header information extracting step for extracting repeat-first-field information, progressive-sequence information and progressive-frame information contained in an input stream corresponding to each picture as header information from said stream;

a storing step for storing said header information extracted in said header information extracting step;

a controlling step for reading said header information stored in said storing step in accordance with an order in which said pictures are displayed, causing a 3:2 pull-down display to be performed when paid repeat-first-field information contained in the relevant header information indicates a re-display of the relevant picture, determining whether each picture is for the progressive scanning based on said progressive-sequence information when said repeat-first-field information does not indicate a re-display of the relevant picture, and carrying out a control to re-display one field of a picture once every two frames when the result of said determination indicates the progressive scanning; and an outputting step for outputting picture data in accordance with instructions by said controlling step.

6. A method of converting a frame rate in a moving picture decoder according to claim 5, wherein said controlling step is for determining whether each picture is for the progressive scanning based op said progressive-sequence information, determining whether a first field and a second field constituting one frame of pictures are composed of picture data of the same time instant based on said progressive-frame information when the result of the determination based on said progressive-sequence information does not indicate the progressive scanning, carrying out a control to re-display one field of picture once every two frames when the result of the determination based on said progressive-frame information indicates that the picture data is of the same time instant, and carrying out a control to re-display one frame of pictures once every four frames when the result of the determination based on said progressive-frame information indicates that the picture data is not of the same time instant.

7. A computer readable record medium on which is recorded a frame-rate converting program for decoding encoded moving picture data whose output frame rate has been set to 24 Hz and providing pictures at an output frame rate of 30 Hz or 60 Hz based on the decoded moving picture data, said frame-rate converting program is for causing a computer to execute:

a header information extracting step for extracting repeat-first-field information, progressive-sequence information and progressive-frame information contained in an input stream corresponding to each picture as header information from said stream;

a storing step for storing said header information extracted in said header information extracting step;

a controlling step for reading said header information stored in said storing step in accordance with an order in which said pictures are displayed, causing a 3:2 pull-down display to be performed when said repeat-first-field information contained in the relevant header information indicates a re-display of the relevant picture, determining whether each picture is for the progressive scanning based on said progressive-sequence information when said repeat-first-field information does not indicate a re-display of the relevant picture, and carrying out a control to re-display one field of a picture once every two frames when the result of said determination indicates the progressive scanning; and an outputting step for outputting picture data in accordance with instructions by said controlling step.

8. A computer readable record medium according to claim 7, wherein said controlling step is for determining whether each picture is for the progressive scanning based on said progressive-sequence information, determining whether a first field and a second field constituting one frame of pictures are composed of picture data of the same time instant based on said progressive-frame information, when the result of the determination based on said progressive-sequence information does not indicate the progressive scanning, carrying out a control to re-display one field of a picture once every two frames when the result of the determination based on said progressive-frame information indicates that the picture data is of the same time instant, and carrying out a control to re-display one frame of pictures once every four frames when the result of the determination based on said progressive-frame information indicates that the picture data is not of the same time instant.

9. An integrated circuit device provided with a frame-rate converting circuit for decoding encoded moving picture data whose output frame rate has been set to 24 Hz and outputting pictures at an output frame rate of 30 Hz or 60 Hz based on the decoded moving picture data, said integrated circuit device comprising:

a header information extracting section for extracting repeat-first-field information, progressive-sequence information and progressive-frame information contained in an input stream corresponding to each picture as header information from said stream;

a storage section for storing said header information extracted by said header information extracting section;

a control section for reading said header information stored in said storage section in accordance with an order in which said pictures are displayed, causing a 3:2 pull-down display to be performed when said repeat-first-field information contained in the relevant header information indicates a re-display of the relevant picture, determining whether a picture is for the progressive scanning based on said progressive-sequence information when said repeat-first-field information does not indicate a re-display of the relevant picture, and carrying out a control to re-display one field of a picture once every two frames when the result of said determination indicates the progressive scanning; and an output section for outputting picture data in accordance with instructions from said control section.

10. An integrated circuit device according to claim 9, wherein said control section determines whether each picture is for the progressive scanning based on said progressive-sequence information, determines whether a first field and a second field constituting one frame of pictures are composed of picture data of the same time instant based on said progressive-frame information when the result of the determination based on said progressive-sequence information does not indicate the progressive scanning, carries out a control to re-display one field of a picture once every two frames when the result of the determination based on said progressive-frame information indicates that the picture data is of the same time instant, and carries out a control to re-display one frame of pictures once every four frames when the result of the determination based on said progressive-frame information indicates that the picture data is not of the same time instant.

* * * * *